United States Patent [19]

Beni et al.

[11] 4,257,856

[45] Mar. 24, 1981

[54] ELECTROLYTIC PROCESS USEFUL FOR THE ELECTROLYSIS OF WATER

[75] Inventors: Gerardo Beni, Westfield; William C. Dautremont-Smith, Cranford; Lawrence M. Schiavone, Howell; Joseph L. Shay, Holmdel, all of N.J.

[73] Assignee: Bell Telephone Laboratories, Incorporated, Murray Hill, N.J.

[21] Appl. No.: 85,819

[22] Filed: Oct. 17, 1979

[51] Int. Cl.³ .......................... C25G 1/04; C25B 11/08
[52] U.S. Cl. ................. 204/129; 204/192 C; 204/278; 204/291
[58] Field of Search ............... 204/291, 192 C, 129, 204/278

[56] References Cited

U.S. PATENT DOCUMENTS

| 3,654,188 | 4/1972 | Kolf | 204/291 |
|---|---|---|---|
| 4,039,698 | 8/1977 | Fraser et al. | 204/192 C |
| 4,046,712 | 9/1977 | Cairns et al. | 204/192 C |
| 4,157,943 | 6/1974 | Scarfellino et al. | 204/291 |

*Primary Examiner*—R. L. Andrews
*Attorney, Agent, or Firm*—Bruce S. Schneider

[57] ABSTRACT

It is possible to significantly increase the efficiency of the electrolysis of water into hydrogen and oxygen while maintaining stability of the anode. This efficiency increase is obtained by using an iridium oxide anode which is produced by vacuum deposition techniques.

4 Claims, 3 Drawing Figures

ELECTROLYTIC PROCESS USEFUL FOR THE ELECTROLYSIS OF WATER

BACKGROUND OF THE INVENTION

1. Field of the Invention

This invention relates to electrochemical processes and, in particular, to electrolysis.

2. Art Background

Presently, electrical generation in a primary power facility must be varied in accordance with the power demands at a particular time of day. This variation is obviously inefficient and causes additional wear on equipment such as generators. Various forms of energy storage have been suggested to reduce this inefficiency and equipment wear. For example, it has been proposed that the energy generation be maintained at a constant level throughout the day and that excess energy produced at any particular time be stored.

One proposed method employs this excess energy to produce hydrogen through electrolysis. The hydrogen gas thus produced is stored and combusted when desired to regain energy. Since hydrogen gas is easily stored without loss of potential energy, this method mitigates some of the problems associated with other methods of power storage, e.g., use of batteries.

Because of the potential advantages of hydrogen energy storage, and because of the interest in water electrolysis as it relates to fuel cells, the electrolysis of water has been an extremely well studied electrochemical reaction. Generally, the efficiency of the anode reaction, i.e., $4OH^- \rightarrow 2H_2O + O_2 + 4e^-$ rather than the hydrogen producing cathode reaction has limited the efficiency of the cell and thus the efficiency of $H_2$ production. The efficiency for such a half cell reaction is generally reported by quoting an overvoltage required to produce a given current density, typically 100–1000 mA/cm$^2$. Overvoltage is the potential above the thermodynamical value required to produce electrolysis at a given rate for a given temperature, pressure, and pH of the electrolyte. (See Bockris and Reddy, *Modern Electrochemistry*, page 883, (Plenum) New York, 1970.) Typically, overvoltages of approximately 1 volt are necessary to produce a current density of 100 mA/cm$^2$.

Despite the efforts to develop a more efficient anode, the efficiency of electrolysis obtainable with a particular anode material is extremely unpredictable. Indeed, efficiencies vary appreciably with the electrode used. For example, when an elemental iridium anode is utilized, a voltage of about 2.1 volts versus a reversible hydrogen electrode (RHE), i.e., a 0.87 volt overpotential, at room temperature in 0.5 M $H_2SO_4$ is necessary to produce a 100 mA/cm$^2$ current density (and thus a corresponding rate of $H_2$ production). In contrast, when an elemental Pt anode is utilized under the same conditions, 3.0 volts versus RHE, i.e., 1.77 overvoltage, are necessary to produce the same current density.

Other difficulties also arise in attempting to design a cell for electrolysis of water. Generally electrolysis will not occur in a non-conductive medium. The requisite level of conductivity in water is usually achieved by adding ionic compounds that produce either acidic or basic solutions. However, efficiency varies with the acidity or basicity of the water, i.e., the pH of the water. For example, an elemental iridium anode is most efficient in acid solution, e.g., in the pH range 0 to 3. In this range it requires approximately 2.1 volts versus RHE, i.e., 0.87 volts overvoltage, to produce a current density of 100 mA/cm$^2$ at a pH of 0. In contrast, nickel is more efficient in basic solutions—1.5 volts versus RHE, i.e., 1.1 volts overvoltage, yields 100 mA/cm$^2$ at a pH of 14. Similarly, $NiCo_2O_4$ is even more efficient in basic solutions. With this anode 1.69 volts versus RHE (overvoltage of 1.29 volts) applied yields 250 mA/cm$^2$ at a pH of 14.7.

To add to the complications and unpredictability introduced by electrode composition effects and by pH, other difficulties arise. For example, basic or acidic solution can adversely affect electrode stability. In fact, anodic iridium oxide anodes, although initially yielding good efficiency, after approximately 20 minutes for typical conditions rapidly decay due to dissolution of the iridium oxide. (See Gottesfeld and Srinivasan, *Journal Electroanalytical Chemistry*, 84, 117 (1977).)

SUMMARY OF THE INVENTION

It is possible by an appropriate choice of anode effectively to electrolyze both basic and acidic aqueous solutions while maintaining the stability of the electrode. The anode must contain a vacuum deposited iridium oxide, e.g., a film formed by a sputtering technique such as reactive sputtering. When such an electrode is utilized, a voltage of 1.69 volts versus RHE (overvoltage of 1.29 volts) produces a current density of about 3.0 amp/cm$^2$ at equilibrium after 3 hours in a pH 14.7 solution of 5 M aqueous KOH as compared to 250 mA/cm$^2$ for an $NiCo_2O_4$ electrode at essentially the same conditions. (See Tseung and Jasem, *Electrochimica Acta*, 22, 31–34, (1977) for data concerning $NiCo_2O_4$.) Similarly, at room temperature a voltage of 1.95 volts versus RHE, i.e., overvoltage of 0.72 volts, in an aqueous solution having a pH of 0.0 yields 100 mA/cm$^2$ for a vacuum deposited iridium oxide anode as compared to 32 mA/cm$^2$ for elemental iridium (after 17 hours of operation when a steady state has been reached).

DETAILED DESCRIPTION

Figure 1:
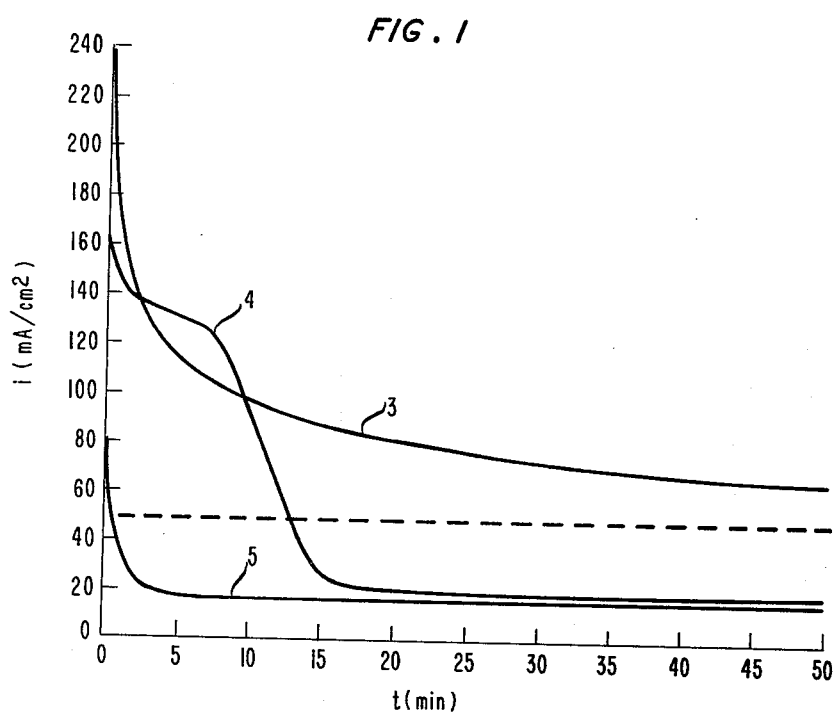
FIGS. 1, 2, and 3 show results obtained by the practice of the subject invention.

The vacuum deposited iridium oxide films useful as anodes for the electrolysis of water are typically deposited on a supporting substrate. This substrate should be electrically conducting to facilitate the production of an appropriate electrical contact to the sputtered film. Typically, a non-precious metal substrate such as tantalum is utilized. As discussed, the film is deposited by vacuum deposition onto the substrate. In a preferred embodiment, reactive sputtering is used to deposit the film. An iridium target approximately 2 inches in diameter and 15 mils thick composed of 99.9% pure iridium is positioned in the target holder of a conventional sputtering apparatus, e.g., rf sputtering apparatus. (See *Vacuum Deposition of Thin Films*, L. Holland (Chapman and Hall, London, 1966) for a description of a typical sputtering apparatus.) The substrate to be coated with the iridium oxide film is placed on a watercooled substrate holder in the sputtering chamber. The chamber is then evacuated to a pressure less than $10^{-6}$ Torr. An oxidizing atmosphere is then introduced into the chamber.

In a preferred embodiment, $O_2$ is utilized. Total pressures too high to prevent a discharge from being struck are not desirable. Generally for this reason pressures below 200 μm, preferably below 100 μm are desirable. If too low an $O_2$ pressure is utilized, e.g., if less than about 0.1 μm of $O_2$ is employed then a discharge is not sustainable. Acceptable devices are producible when $O_2$ pressures in the range 1 μm to 30 μm are utilized.

Once the oxidizing atmosphere is introduced a plasma is then struck by a conventional technique such as rf excitation. The deposition is continued typically at rf power density levels in the range of 0.75 watts/cm$^2$ of target to 6.5 watts/cm$^2$ corresponding to target voltages in the range 500 to 1200 volts, for a time sufficient to yield the desired thickness of the iridium oxide. Generally, the deposition rate of the iridium oxide is in the range 20 to 500 Å/min. Cost factors suggest the use of thin films, e.g., films less than 5000 Å. However, thicker films although more costly are not precluded.

In a preferred embodiment, the electrolytic cell used for the electrolysis of water in the subject invention is produced by intimately contacting an anode containing the vacuum deposited iridium oxide with an aqueous medium and by also intimately contacting a suitable cathode in such a medium. The cathode should be electronically conducting and should promote the production of hydrogen. A typical material for use in the cathode is Pt. Electrical contact to the cathode and to the vacuum deposited iridium oxide is made by conventional techniques such as pressure contacts to the conducting substrate.

A voltage is impressed between the two electrodes. This voltage should be sufficient to produce electrolysis of water. The voltage utilized depends upon the rate of electrolysis desired. In some circumstances, it is more desirable to use a lower voltage, and accept a lower rate of hydrogen production. It is possible to compensate for this lower rate of hydrogen production by utilizing a larger number of electrolytic cells. On the other hand, if the number of cells is limited and higher power consumption is acceptable, higher voltage is useful and correspondingly higher currents are obtainable. The voltage is adjusted to yield the desired currents, i.e., rate of $H_2$ production. Voltages depend on the aqueous medium. However, for solutions such as 0.5 M $H_2SO_4$, or 5 M aqueous KOH, voltages in the range 1.5 to 2.5 volts are generally operable.

The aqueous medium which is electrolyzed in the preferred embodiment also functions as the electrolyte for ion transport to complete the electrochemical circuit. Therefore, it must be sufficiently conductive to avoid energy waste through joule heating. Typically, the solution should have a resistance such that the power loss due to joule heating is less than 5%. This requirement corresponds approximately to a resistance per unit area of electrode in the electrolyte of less than 1 ohm/cm$^2$. The resistance limitation is easily satisfied by adding a salt to the aqueous medium. The salt is added until the desired resistance is obtained. It should be noted that using a vacuum deposited iridium oxide electrode allows electrolysis of water solutions closely approaching a pH of 7 although efficiencies are reduced. It should also be noted that electrolytic cells have been reported where the aqueous medium did not function as the electrolyte for completing the circuit, i.e., a H$^+$ conductor such as perfluorosulfonic acid resin is inserted between the cathode and anode and the remaining surface of each electrode is contacted with an aqueous medium. (See *Extended Abstracts of the Spring Meeting of the Electrochemical Society,* Seattle, Washington, May 21–26, 1978, p. 1,196.) Such schemes are not precluded in the subject invention. The invention involves the use of vacuum sputtered iridium oxide to induce $O_2$ production at the anode of an electrolytic cell.

The recent voltage history of the anode influences the current density achieved at a particular applied voltage. For example, if a voltage initially is applied and the current density is monitored, this current monotonically decreases until a steady state is reached. (See FIG. 1.) To mitigate this effect and obtain a higher average current density it is possible to utilize a pulse technique. If a voltage is applied and then after a short period, e.g., 2 seconds, momentarily reduced, e.g., by 0.8 volts, for an even shorter period of time, e.g., 200 msec upon returning to the initial voltage after this momentary interruption the initial undecayed current is obtained. (This current then begins again to decay and pulsing is repeated.) Additionally, it is possible to affect the initial current before decay by applying a higher voltage, e.g., 1.3 volts above the desired voltage for a short period, e.g., 30 seconds and then reducing the voltage to that desired for operation of the cell.

The cell should be structured so that the hydrogen produced at the cathode and the oxygen produced at the anode do not recombine to form water. This is accomplished, for example, by introducing an asbestos barrier in cells which use the aqueous medium as the electrolyte into this medium between the anode and cathode. This barrier allows ion conduction but does not permit migration of the gaseous oxygen or hydrogen across the barrier. (See *Extended Abstracts of the Fall Meeting of the Electrochemical Society,* Los Angeles, Calif., p. 1,183.) As the gases are evolved they are collected by conventional techniques such as through the use of liquid gas separators. The following examples demonstrate the pH dependency of the electrolysis reaction and compare the efficiency obtained by the subject invention to other known electrolytic cells. For convenience the means for separating and collecting the evolved gases has been omitted in the following examples.

EXAMPLE 1

A tantalum substrate approximately ½ by 1 inch was cleaned by sequentially treating with a detergent solution, followed by rinsing in distilled water, and ultrasonically cleaning in isopropanol. The tantalum substrate was then put into a vapor degreaser utilizing isopropanol. This treatment was continued for approximately 1 hour and the tantalum was then blown dry with nitrogen gas. The substrate was placed on a watercooled sample holder of a conventional sputtering apparatus. The sputtering chamber was evacuated to a pressure of $2 \times 10^{-7}$ Torr. The chamber was then backfilled with $O_2$ which has been run through a water bubbler. (It was later found that the treatment with the water bubbler was unnecessary. However, the results obtained either with or without the water bubbler were the same and the use of the bubbler is not precluded.) The $O_2$ pressure was allowed to rise to approximately 30 μm to flush out the system. After a period of approximately 2 minutes, the discharge was ignited by utilizing an rf discharge employing an rf power of 60 watts and a target bias voltage of 1 kV. The target utilized was a disk of 99.9% pure iridium measuring approximately 2 inches in diameter and having a thickness of approximately 15 mils. Once the discharge was ignited the $O_2$ pressure was reduced to between 7 and 9 μm. The deposition after the plasma was ignited was continued for approximately 2 hours. The discharge was then extinguished, the substrate was allowed to cool, and then the chamber was backfilled with nitrogen gas.

The coated tantalum was then removed from the sputtering apparatus. A Pt wire was spot welded to the tantalum surface opposite to the surface coated with the iridium oxide and all of the electrode except a 0.2 cm$^2$ area of iridium oxide was coated with an insulating varnish. A crystallizing dish of approximately 6 inches in diameter was filled to a depth of approximately 1½ inches with 0.5 M sulfuric acid. The iridium oxide coated electrode was placed with the iridium oxide facing upwards at the bottom of the crystallizing dish. A pump was connected to withdraw the electrolyte from the perimeter of the crystallizing dish and to reintroduce this withdrawn electrolyte directly above the vacuum deposited iridium oxide coated anode. This was done to immediately displace the $O_2$ bubbles which were evolved at the anode. A Pt electrode was also immersed in the electrolyte. A Luggin capillary was inserted into the electrolyte with the tip of the capillary being approximately 0.2 cm from the iridium oxide electrode. A saturated calomel electrode was then inserted into the Luggin capillary. This combination of saturated calomel electrode and Luggin capillary was used as a reference for the voltage applied to the anode. A potentiostat was used to control the potential of the iridium oxide electrode relative to the SCE. The potentiostat is utilized to apply to the Pt cathode a voltage necessary to yield the desired potential between the anode and the SCE reference electrode. When a voltage of 1.6 versus the SCE was applied to the anode and the current monitored for a 17 hour period after the voltage was applied, the results shown in FIG. 1 by line 3 were obtained. After 17 hours no noticeable decrease in current density occurred. (The dotted line indicates the current density after 17 hours for this cell.)

EXAMPLE 2

The same experiment as in Example 1 was performed except an anodic iridium oxide electrode was utilized. This electrode was produced as described in Gottesfeld et al, *Applied Physics Letters*, 33, 208 (1978). The iridium substrate upon which the anodic iridium oxide was grown was contacted by spot welding a Pt lead to the unoxidized surface of the iridium. The voltage was applied as described in Example 1 and the current during the 17 hour period monitored. The results of this process are shown in FIG. 1 by the line denominated 4.

EXAMPLE 3

The same cell as described in Example 1 was made except that an iridium electrode was used instead of the sputtered iridium oxide electrode. The results obtained while monitoring the cell during the 17 hour period is shown by line 5 in FIG. 1. As can be seen, the results obtained for the anodic iridium oxide electrode after 15 minutes corresponded with the results obtained for the iridium electrode. This occurred because after the 15 minute interval all the anodic iridium oxide film either dissolved or detached itself from the iridium substrate.

EXAMPLE 4

Figure 2:
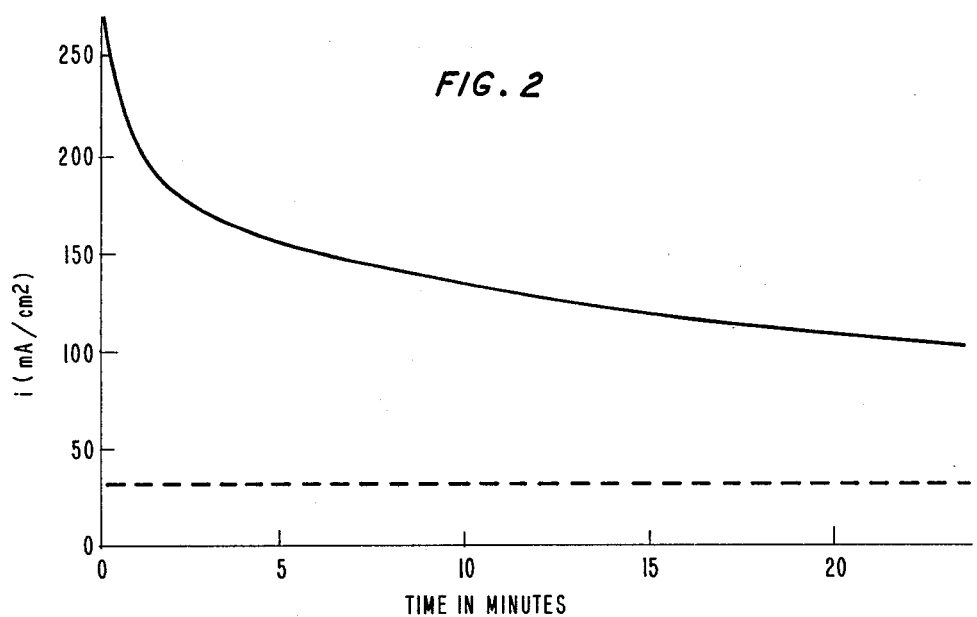

The same cell was built as described in Example 1 except the area of the iridium oxide film left exposed was 0.063 cm$^2$. Additionally, the electrolyte used was a 5 N KOH aqueous solution. This corresponds to a pH of approximately 14.7. (The pH was monitored as in all the examples with a standard pH meter and as in all the examples did not change appreciably during the procedure.) The voltage initially applied was 0.77 volts versus SCE. The results obtained by monitoring the current for 17 hours is shown in FIG. 2. (The dotted line indicates the current density after 17 hours for this cell.)

EXAMPLE 5

Figure 3:
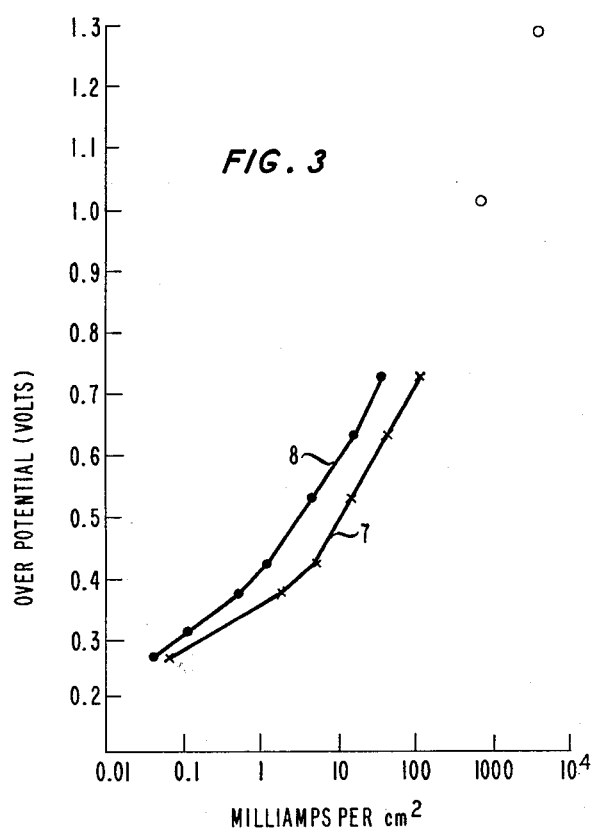

The cell as described in Example 1 was built. A voltage was applied to the cell and maintained for 17 hours. After the 17 hour period, the current density was measured. The results obtained for a variety of applied voltages are shown in FIG. 3 by the line denoted 7. (These points in each case were taken 17 hours after application of the respective voltages.) The points on this line indicated by the crossmarks are the results obtained in 0.5 M sulfuric acid. The same cell using basic solution was also tested. The points indicated by circles were the results obtained when 5 N KOH solution was used instead of the 0.5 M sulfuric acid. For the results in basic solution readings were taken after about 3 hours when equilibrium appeared to be reached. It should be noted that the voltages given in FIG. 3 in each case are overvoltages.

EXAMPLE 6

The cell as described in Example 3 was built. The procedure as described in Example 5 was followed. The results obtained for acidic solution (0.5 M $H_2SO_4$) are shown by line 8. As can be seen, a higher current density for a given overvoltage was obtained with the sputtered iridium oxide electrode.

We claim:

1. A process of electrolyzing water comprising the steps of contacting an aqueous medium with a cathode and an anode and applying to said cathode and said anode a potential between these electrodes sufficient to produce hydrogen characterized in that said anode comprises sputtered iridium oxide.

2. The process of claim 1 wherein said aqueous medium is acidic.

3. The process of claim 1 wherein said aqueous medium is basic.

4. An electrolytic cell comprising a first and second electrode characterized in that said first electrode comprises sputtered iridium oxide, said second electrode is adapted to promote the production of hydrogen, and means are provided for collecting hydrogen.

* * * * *